United States Patent
Kao et al.

(10) Patent No.: US 8,629,587 B2
(45) Date of Patent: Jan. 14, 2014

(54) WATER-COOLING STRUCTURE FOR ELECTRIC MOTOR

(75) Inventors: Pai-Ling Kao, Sinjhuang (TW);
Sung-Wei Lee, Sinjhuang (TW);
Jing-Rong Peng, Sinjhuang (TW)

(73) Assignee: Asia Vital Components Co., Ltd., Sinjhuang (TW)

( * ) Notice: Subject to any disclaimer, the term of this patent is extended or adjusted under 35 U.S.C. 154(b) by 332 days.

(21) Appl. No.: 12/977,066

(22) Filed: Dec. 23, 2010

(65) Prior Publication Data

US 2012/0161553 A1 Jun. 28, 2012

(51) Int. Cl.
*H02K 9/19* (2006.01)
*H02K 5/20* (2006.01)
*H02K 3/22* (2006.01)

(52) U.S. Cl.
CPC .. *H02K 5/20* (2013.01); *H02K 9/19* (2013.01); *H02K 3/22* (2013.01)
USPC .................. 310/54; 310/52; 310/57; 310/58; 310/59

(58) Field of Classification Search
CPC .............. H02K 3/22; H02K 5/20; H02K 9/19
USPC ......................... 310/52, 54, 57, 59
See application file for complete search history.

(56) References Cited

U.S. PATENT DOCUMENTS

| | | | | |
|---|---|---|---|---|
| 2,381,297 | A * | 8/1945 | Lynn | 310/61 |
| 3,116,429 | A * | 12/1963 | Harrington et al. | 310/64 |
| 4,182,966 | A * | 1/1980 | Mishra et al. | 310/59 |
| 4,319,149 | A * | 3/1982 | Eckels | 310/52 |
| 4,492,088 | A * | 1/1985 | Ibrahim et al. | 62/50.7 |
| 4,602,177 | A * | 7/1986 | Eckels et al. | 310/57 |
| 5,585,681 | A * | 12/1996 | Bitsche | 310/54 |
| 5,616,973 | A * | 4/1997 | Khazanov et al. | 310/54 |
| 5,731,643 | A * | 3/1998 | Avakian et al. | 310/53 |
| 5,869,912 | A * | 2/1999 | Andrew et al. | 310/52 |
| 6,498,408 | B2 * | 12/2002 | Tong et al. | 310/65 |
| 6,777,836 | B2 * | 8/2004 | Tong et al. | 310/65 |
| 6,909,210 | B1 * | 6/2005 | Bostwick | 310/52 |
| 7,591,147 | B2 * | 9/2009 | Masoudipour et al. | 62/505 |
| 7,701,095 | B2 * | 4/2010 | Gizaw et al. | 310/54 |
| 2008/0030085 | A1* | 2/2008 | Gizaw et al. | 310/54 |
| 2008/0223557 | A1* | 9/2008 | Fulton et al. | 165/104.33 |
| 2012/0161553 | A1* | 6/2012 | Kao et al. | 310/54 |

* cited by examiner

*Primary Examiner* — John K Kim
(74) *Attorney, Agent, or Firm* — C. G. Mersereau; Nikolai & Mersereau, P.A.

(57) ABSTRACT

A water-cooling structure for electric motor includes a motor main body, a heat-dissipation base, and a vortex-forming section. The motor main body is externally fitted around the heat-dissipation base. The heat-dissipation base is provided around an outer circumferential surface with at least one main flow passage. The vortex-forming section is provided in the main flow passage to create vortex effect on a type of cooling liquid flowing in the main flow passage, so as to enable an increased heat transfer efficiency of the water-cooling structure.

8 Claims, 15 Drawing Sheets

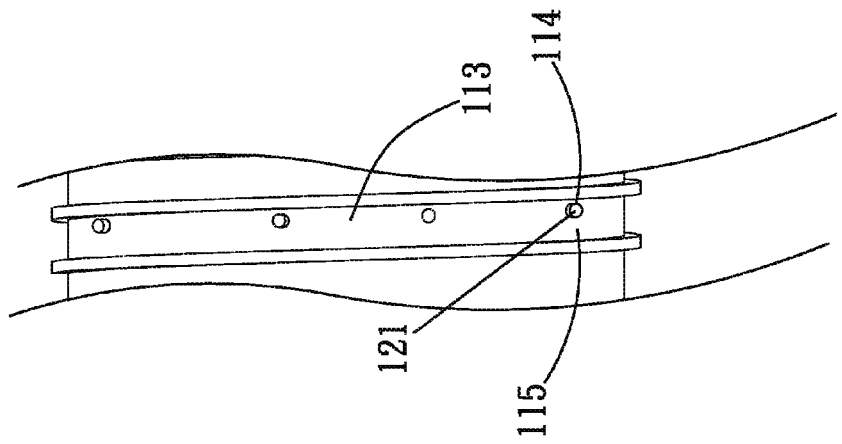
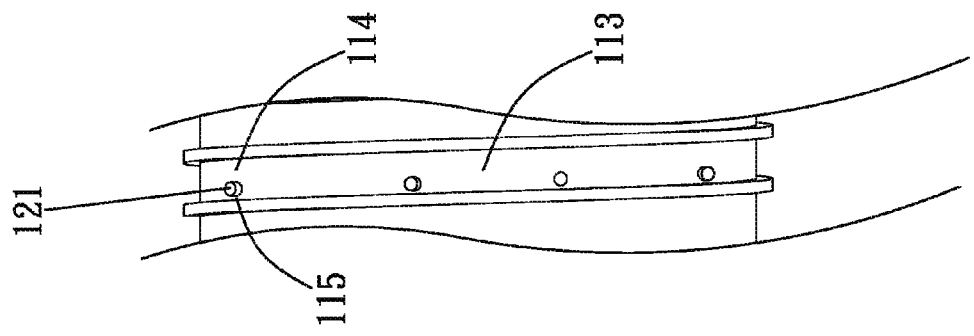
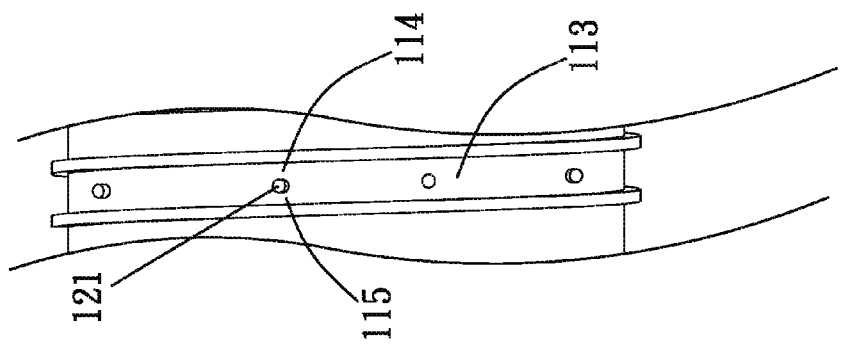
Fig. 3C
Fig. 3B
Fig. 3A

WATER-COOLING STRUCTURE FOR ELECTRIC MOTOR

FIELD OF THE INVENTION

The present invention relates to a water-cooling structure, and more particularly to a water-cooling structure for electric motor.

BACKGROUND OF THE INVENTION

When a general motor operates, the rotor and the stator in the motor are mutually induced and become excited to thereby produce heat. The produced heat is not easily dissipated from the motor into ambient air and therefore tends to cause shortened service life of the motor. To improve the above problem, a water-cooling type motor is developed.

FIG. 16 is an exploded perspective view of a conventional water-cooling type motor, which includes a motor main body 30 and a heat-dissipation base 31. The motor main body 30 includes an enclosure 303, two covers 306 and 307, a rotor 301, and a stator 302 fitted around the rotor 301. The enclosure 303 internally defines a receiving space 3033 for receiving the heat-dissipation base 31 therein. The two covers 306, 307 are connected to two ends of the receiving space 3033. The enclosure 303 is further provided on an outer side 3031 thereof with an outlet 30311 and an inlet 30312 opposite to the outlet 30311.

The heat-dissipation base 31 has a hollow chamber 312 communicating with the receiving space 3033 for receiving the stator 302 and the rotor 301 therein. A flow passage 313 is provided around an outer circumferential surface of the heat-dissipation base 31 to communicate with the outlet 30311 and the inlet 30312. When the motor operates and produces heat, the heat-dissipation base 31 absorbs the heat from the stator 302 and the rotor 301. A type of cooling liquid, such as water or a coolant, circulates in the flow passage 313 to exchange heat with the heat-dissipation base 31, so as to achieve the purpose of heat dissipation.

While the heat produced by the conventional water-cooling type motor can be dissipated via the cooling liquid in the flow passage 313, the cooling liquid flows through the flow passage 313 at a relatively quick speed and therefore only stays in the heat-dissipation base 31 for a very short time, resulting in a poor heat exchange efficiency between the cooling liquid and the heat-dissipation base 31 and accordingly largely reduced heat dissipation effect.

More specifically, since the flow passage 313 in the conventional water-cooling type motor is a one-way smooth flow passage, the cooling liquid flows through the smooth flow passage 313 quickly and stays in the flow passage 313 only for a short time to carry away only a relative small quantity of heat from the heat-dissipation base 31. That is why the conventional water-cooling structure for the motor has low heat exchange efficiency and heat transfer effect, and accordingly low heat dissipation effect.

In brief, the conventional water-cooling structure for motor has the following disadvantages: (1) poor heat exchange efficiency; and (2) poor heat dissipation effect.

It is therefore tried by the inventor to develop an improved water-cooling structure for electric motor to overcome the drawbacks in the prior art.

SUMMARY OF THE INVENTION

A primary object of the present invention is to provide a water-cooling structure for electric motor, with which separated vortexes can be created in a cooling liquid flowing through the water-cooling structure to enable enhanced flow field turbulence and accordingly upgraded heat transfer performance.

Another object of the present invention is to provide a water-cooling structure for electric motor, in which a flow-dividing structure is provided in a main flow passage to create divided flows. The flow-dividing structure provides increased heat transfer area for contacting with a cooling liquid flowing through the main flow passage to thereby enable an enhanced heat dissipation effect.

A further object of the present invention is to provide a water-cooling structure for electric motor, with which a vortex effect and a flow-dividing effect are simultaneously created in a cooling liquid flowing in a main flow passage to thereby enable upgraded heat dissipation effect.

To achieve the above and other objects, the water-cooling structure for electric motor according to a first embodiment of the present invention includes a motor main body having a rotor and a stator fitted around the rotor, and an enclosure having an inner side defining a receiving space and an outer side provided with an outlet and inlet; a heat-dissipation base being fitted in the receiving space to contact with the inner side of the enclosure, and having a hollow chamber communicating with the receiving space for receiving a sub-assembly of the rotor and stator therein; at least one main flow passage extending around an outer circumferential surface of the heat-dissipation base and communicating with the outlet and the inlet; and a vortex-forming section provided in the main flow passage.

To achieve the above and other objects, the water-cooling structure for electric motor according to a second embodiment of the present invention includes a motor main body having a stator and a rotor fitted in the stator, and an enclosure having an inner side defining a receiving space and an outer side provided with an outlet and an inlet; a heat-dissipation base being fitted in the receiving space to contact with the inner side of the enclosure, and having a hollow chamber communicating with the receiving space for receiving a sub-assembly of the rotor and stator therein; at least one main flow passage extending around an outer circumferential surface of the heat-dissipation base, and having a first and a second end communicating with the outlet and the inlet, respectively; and at least a flow-dividing section provided in the main flow passage between two facing inner sidewalls thereof.

To achieve the above and other objects, the water-cooling structure for electric motor according to a third embodiment of the present invention includes a motor main body having a rotor and a stator fitted around the rotor, and an enclosure having an inner side defining a receiving space and an outer side provided with an outlet and an inlet; a heat-dissipation base being fitted in the receiving space to contact with the inner side of the enclosure, and having a hollow chamber communicating with the receiving space for receiving a sub-assembly of the rotor and stator therein; at least one main flow passage extending around an outer circumferential surface of the heat-dissipation base, and having a first and a second end communicating with the outlet and the inlet, respectively; a flow-dividing section being provided in the main flow passage between two facing inner sidewalls thereof; and a vortex-forming section having a first part provided in the main flow passage between the flow-dividing section and one inner sidewall of the main flow passage, and a second part provided in the main flow passage between two facing inner sidewalls thereof without the flow-dividing section located therebetween.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 3A, 3B and 3C are fragmentary right side views showing three different ways of arranging vortex-forming blocks on the first-type heat-dissipation base of FIG. 2;

DETAILED DESCRIPTION OF THE PREFERRED EMBODIMENTS

Figure 1:
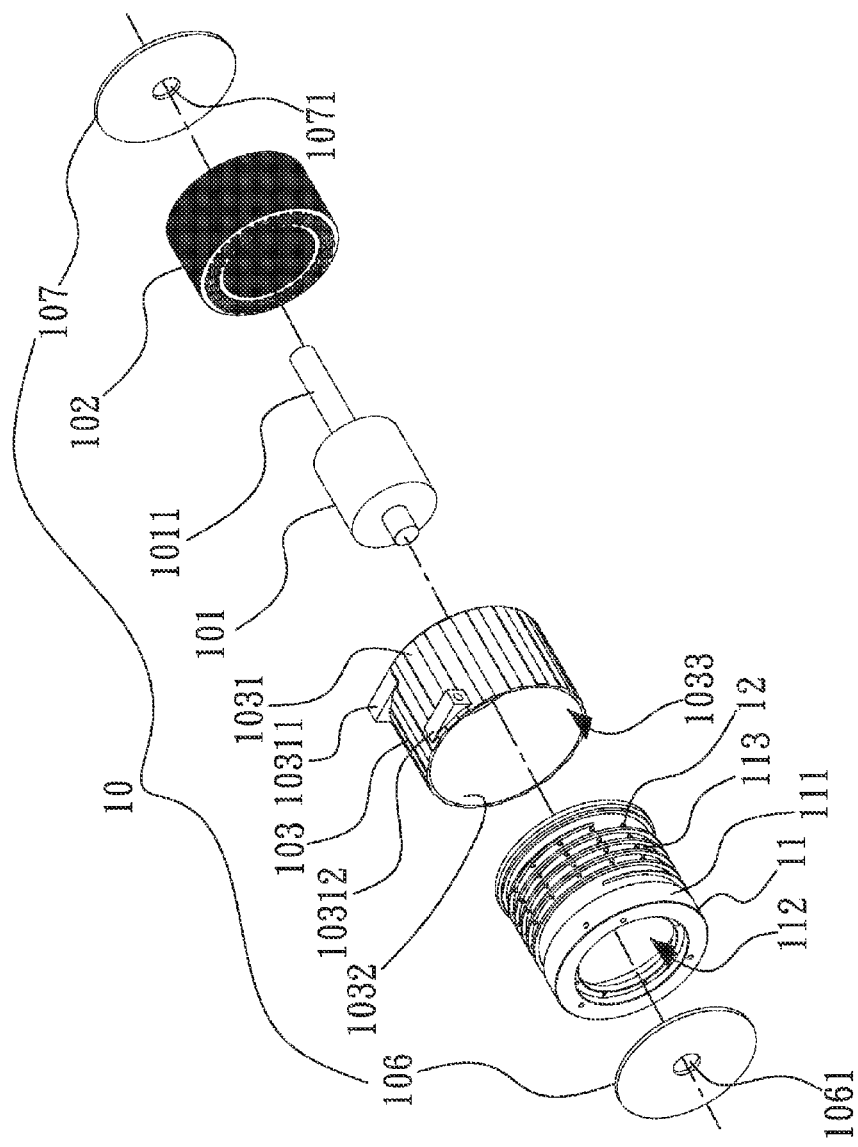
FIG. 1 is an exploded perspective view showing a water-cooling structure for electric motor according to a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is an exploded perspective view of a water-cooling structure for electric motor according to a first preferred embodiment of the present invention. As shown, the water-cooling structure for electric motor according to the first preferred embodiment includes a motor main body 10, a heat-dissipation base 11, and a vortex-forming section 12.

The motor main body 10 includes a rotor 101, a stator 102, an enclosure 103, a first cover 106, and a second cover 107. The rotor 101 has a shaft 1011. The stator 102 is formed from a plurality of laminated silicon steel plates and is wound around by a plurality of coils. The rotor 101 is fitted in the stator 102 to form a sub-assembly, such that the rotor 101 and the stator 102 are magnetically corresponding to each other. The enclosure 103 has an outer side 1031 and an inner side 1032. On the outer side 1031 of the enclosure 103, there are provided an outlet 10311 and an inlet 10312. The inner side 1032 of the enclosure 103 defines a receiving space 1033 therein.

Figure 2:
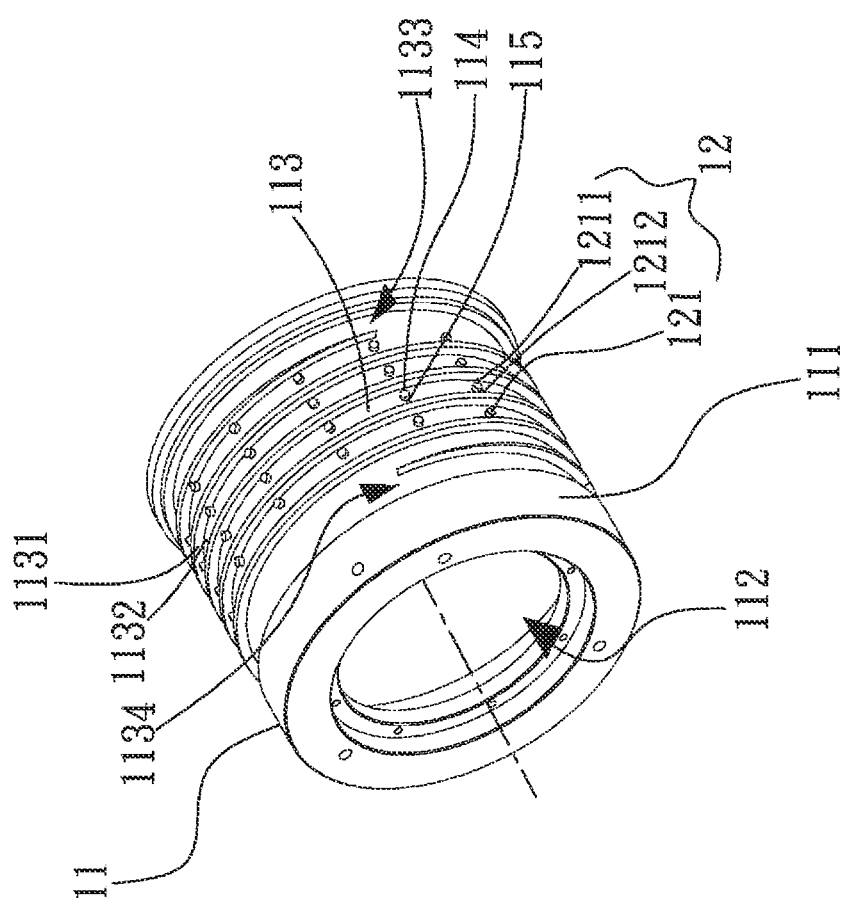
FIG. 2 is a perspective view of a first-type heat-dissipation base for the water-cooling structure according to the first preferred embodiment of the present invention.

FIG. 2 is a perspective view showing a first type of the heat-dissipation base 11 for the first embodiment of the present invention. Please refer to FIGS. 1 and 2 at the same time. The first-type heat-dissipation base 11 has an outer circumferential surface 111, a hollow chamber 112, and at least one main flow passage 113. The first-type heat-dissipation base 11 is fitted in the receiving space 1033 defined in the enclosure 103 of the motor main body 10, such that the outer circumferential surface 111 correspondingly contacts with the inner side 1032 of the enclosure 103. The sub-assembly of the rotor 101 and stator 102 is fitted in the chamber 112. The main flow passage 113 is provided around the outer circumferential surface 111.

The main flow passage 113 has a first inner sidewall 1131, a second inner sidewall 1132, a first end 1133, and a second end 1134. The first inner sidewall 1131 and the second inner sidewall 1132 face toward each other to define the main flow passage 113 therebetween. The first end 1133 and the second end 1134 respectively communicate with the outlet 10311 and the inlet 10312 provided on the enclosure 103 of the motor main body 10.

The first cover 106 and the second cover 107 are separately connected to two axially opposite ends of the receiving space 1033, and are respectively provided with a hole 1061, 1071 communicating with the receiving space 1033.

The vortex-forming section 12 is provided in the main flow passage 113 and includes a plurality of vortex-forming blocks 121 raised from the main flow passage 113. Each of the vortex-forming blocks 121 has a first lateral side 1211 and a second lateral side 1212 opposite to the first lateral side 1211. The first lateral side 1211 of the vortex-forming block 121 and the first inner sidewall 1131 of the main flow passage 113 face toward each other to define a first sub-passage 114 therebetween; and the second lateral side 1212 of the vortex-forming block 121 and the second inner sidewall 1132 of the main flow passage 113 face toward each other to define a second sub-passage 115 therebetween. The first sub-passage 114 and the second sub-passage 115 communicate with the main flow passage 113. A type of cooling liquid in the main flow passage 113 flowing to each vortex-forming block 121 is forced to flow into the first sub-passage 114 and the second sub-passage 115 at the same time. After passing the vortex-forming block 121, the separated cooling liquid flows converge in the main flow passage 113 and create a vortex effect downstream the vortex-forming block 121 to thereby enable effectively increased heat transfer efficiency or increased thermal convection effect, as well as enhanced flow field turbulence.

The first sub-passage 114 and the second sub-passage 115 can be differently arranged in the main flow passage 113 according to a user's actual need or a required heat dissipation environment. For example, the first sub-passage 114 may have a width equal to that of the second sub-passage 115, as shown in FIG. 3A, or larger than that of the second sub-passage 115, as shown in FIG. 3B, or smaller than that of the second sub-passage 115, as shown in FIG. 3C.

Figure 4A:
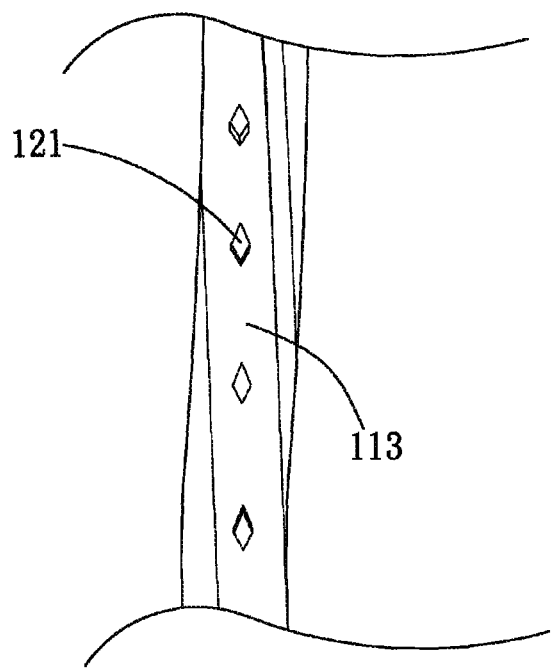
FIGS. 4A to 4D are fragmentary right side views showing four differently shaped vortex-forming blocks for the first-type heat-dissipation base of FIG. 2.
Figure 4B:
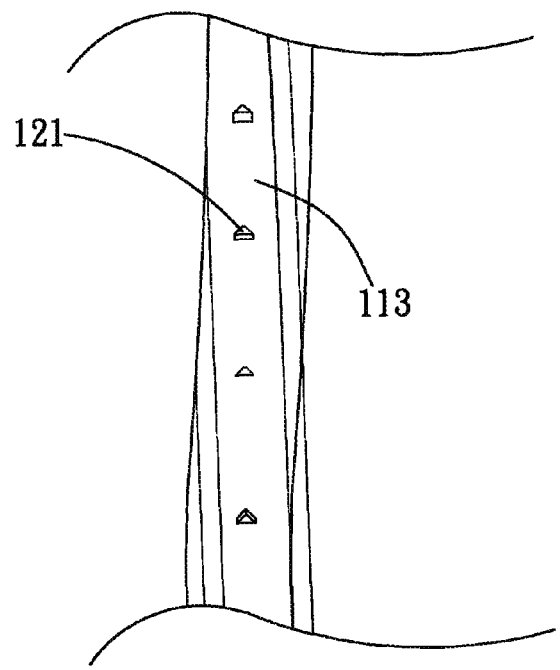
Figure 4C:
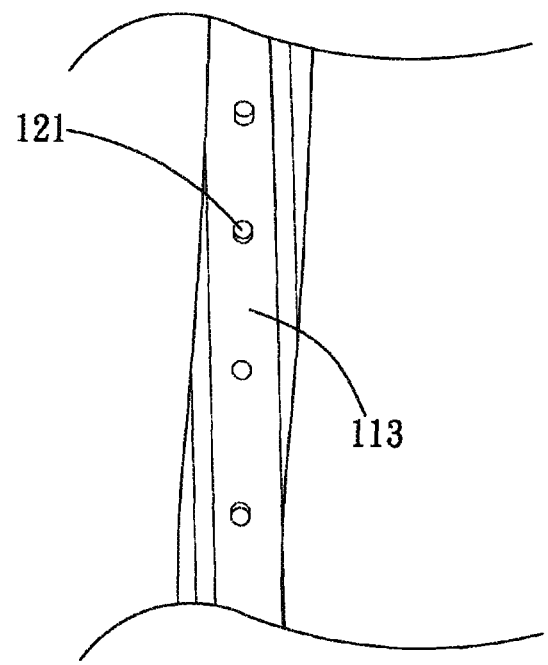
Figure 4D:
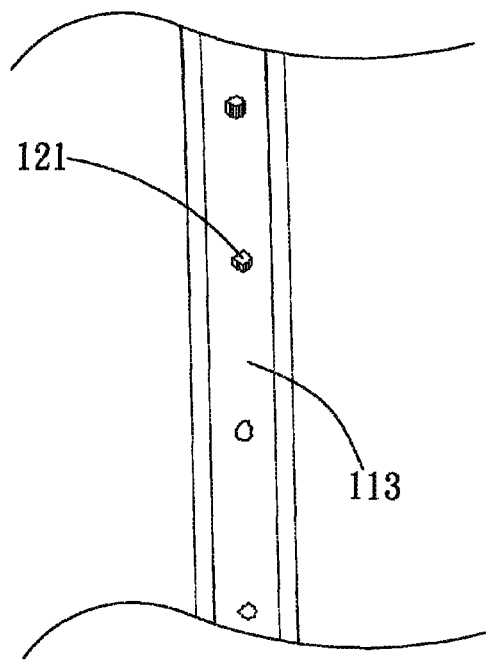

The vortex-forming blocks 121 can be rectangular-shaped without being limited thereto. For example, the vortex-forming blocks 121 can be diamond-shaped as shown in FIG. 4A, triangular-shaped as shown in FIG. 4B, round-shaped as shown in FIG. 4C, or irregularly shaped as shown in FIG. 4D.

Figure 5:
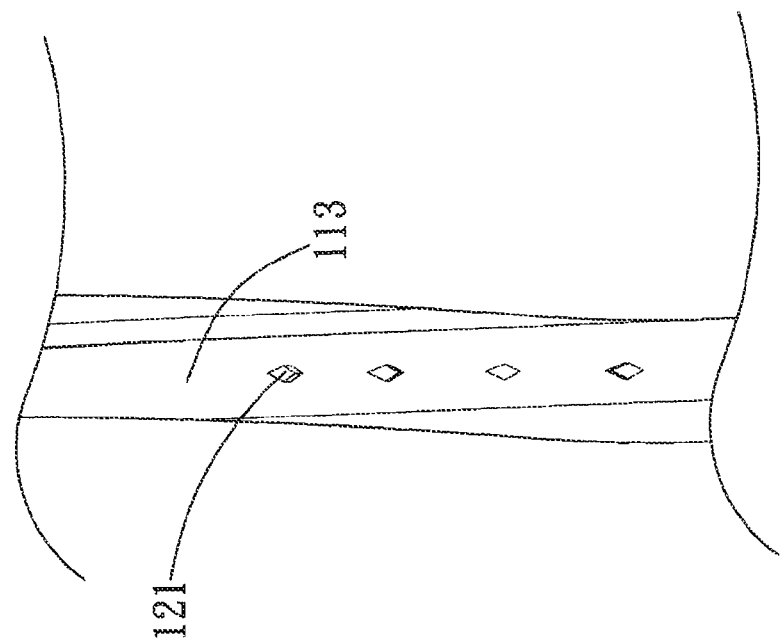
FIG. 5 is another fragmentary right side view of the first-type heat-dissipation base of FIG. 2 showing the vortex-forming blocks thereof in a reduced size.

In the illustrated first preferred embodiment, the vortex-forming blocks 121 respectively have a width equal to one third of a width of the main flow passage 113. However, it is understood, the vortex-forming blocks 121 may be differently sized. For example, the vortex-forming blocks 121 may have a reduced width smaller than one third of the width of the main flow passage 113, as shown in FIG. 5.

Figure 6:
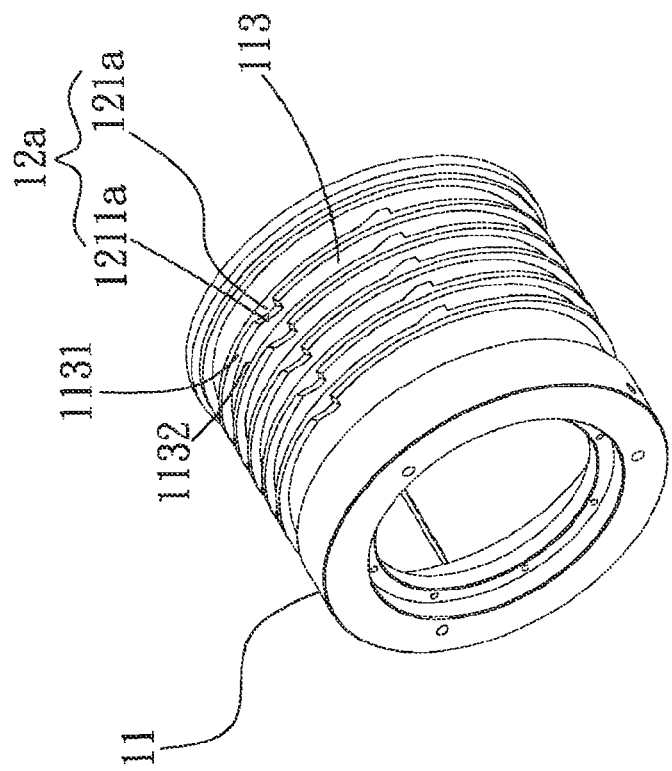
FIG. 6 is a perspective view of a second type of the heat-dissipation base for the water-cooling structure according to the first preferred embodiment of the present invention.

Please refer to FIG. 6 that is a perspective view of a second type of the heat-dissipation base 11 for the first embodiment of the present invention. As shown, the second-type heat-dissipation base 11 has a vortex-forming section 12a including a plurality of vortex-forming blocks 121a, some of which are sidewardly protruded from the first inner sidewall 1131 of the main flow passage 113 toward the second inner sidewall 1132 while others are sidewardly protruded from the second inner sidewall 1132 toward the first inner sidewall 1131, such that the vortex-forming blocks 121a on the first inner sidewall 1131 and the second inner sidewall 1132 in the same main flow passage 113 are arranged in staggered relation to one another. Each of the vortex-forming blocks 121a has a first lateral side 1211a facing toward the first inner sidewall 1131 or the second inner sidewall 1132. The vortex-forming blocks 121a protruded from the first and the second inner sidewall 1131, 1132 alternately interfere with the cooling liquid flowing through the main flow passage 113 to thereby create a vortex effect downstream the vortex-forming blocks 121a and enable effectively increased thermal convection effect.

Thus, in the water-cooling structure for electric motor according to the first preferred embodiment of the present invention, through the provision of the vortex-forming section 12, 12a in the main flow passage 113 on the heat-dissipation base 11 as well as the fitting of the heat-dissipation base 11 in the motor main body 10 to combine the two elements with each other, it is able to obtain effectively increased heat exchange efficiency and effectively enhanced flow field turbulence.

Figure 7:
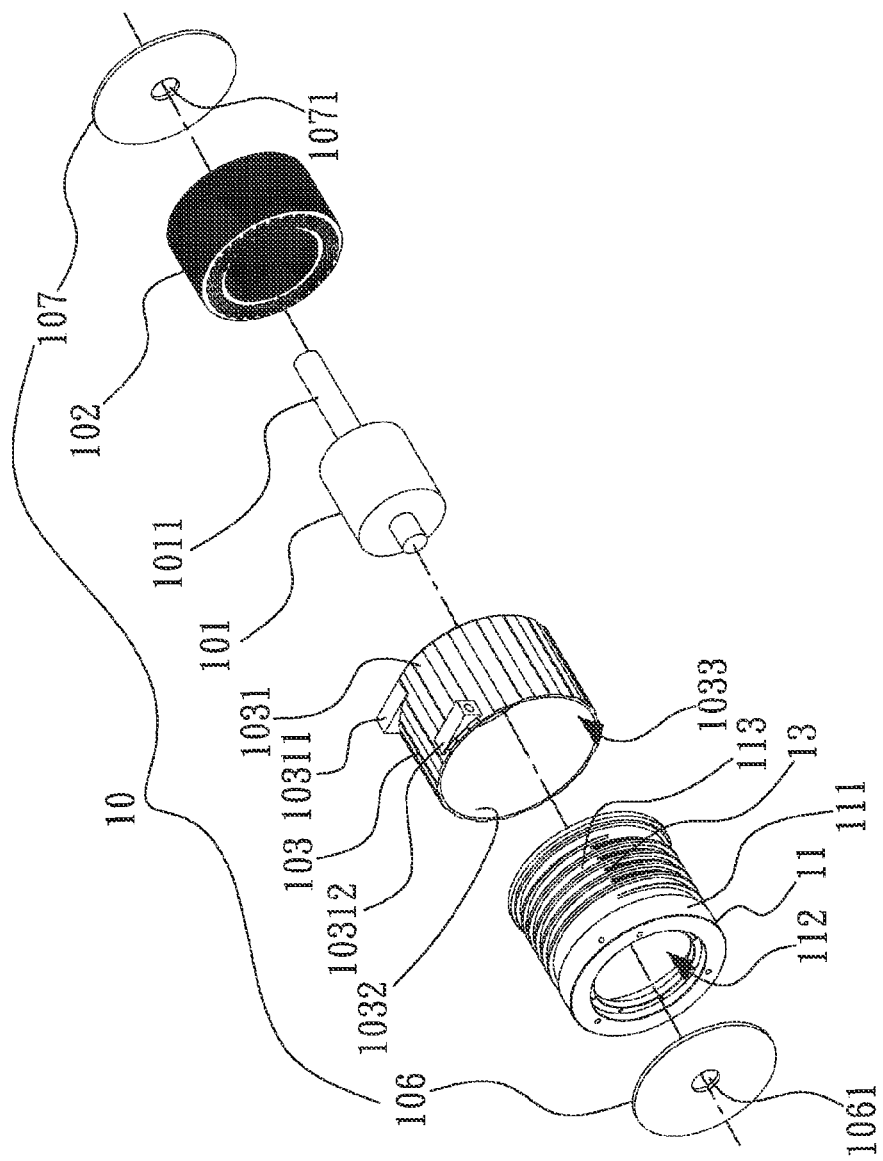
FIG. 7 is an exploded perspective view of a water-cooling structure for electric motor according to a second preferred embodiment of the present invention.
Figure 8:
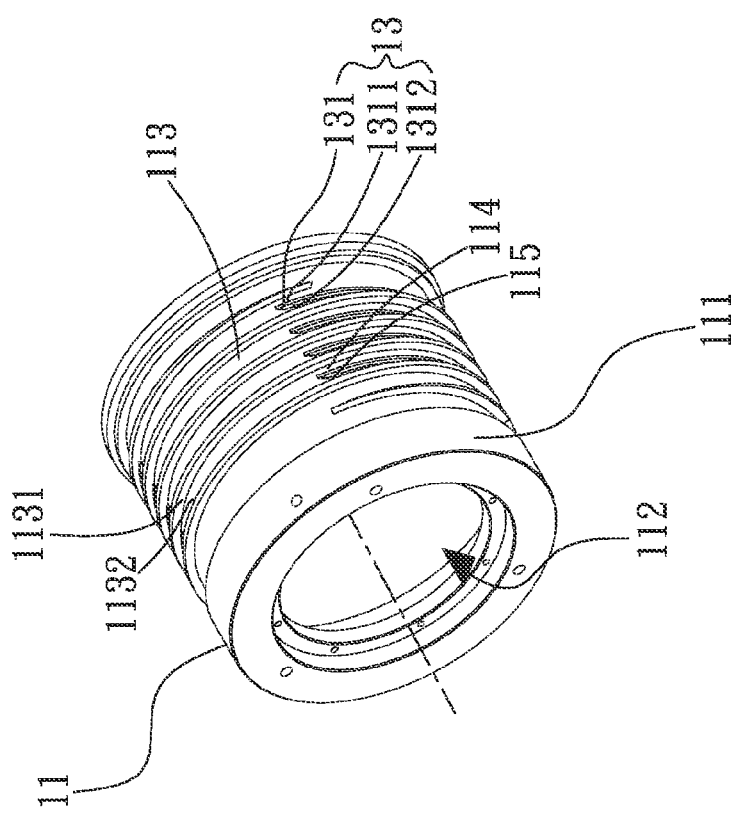
FIG. 8 is a perspective view of a heat-dissipation base for the water-cooling structure according to the second preferred embodiment of the present invention.
Figure 10:
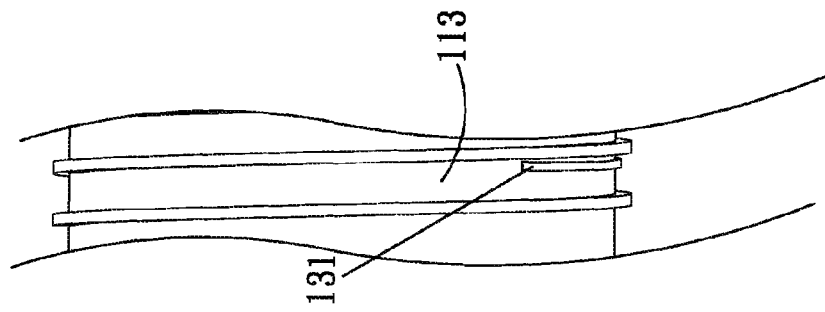
FIG. 10 is another fragmentary right side view of the heat-dissipation base of FIG. 8 showing the flow-dividing protrusions thereof in a reduced size.

Please refer to FIG. 7 that is an exploded perspective view of a water-cooling structure for electric motor according to a second preferred embodiment of the present invention, and to FIG. 8 that is a perspective view of a heat-dissipation base 11 for the second embodiment of the present invention. As shown, the second embodiment is generally structurally similar to the first embodiment except that the heat-dissipation base 11 includes a flow-dividing section 13 in place of the vortex-forming section 12. The heat-dissipation base 11 in the second embodiment has a hollow chamber 112 communicating with the receiving space 1033 in the enclosure 103 of the motor main body 10, and at least one main flow passage 113. The heat-dissipation base 11 is fitted in the receiving space 1033 to contact with the inner side 1032 thereof; the sub-assembly of the rotor 101 and stator 102 is fitted in the chamber 112; and the main flow passage 113 is formed around the outer circumferential surface 111 of the heat-dissipation base 11.

The flow-dividing section 13 is provided in the main flow passage 113 between the two facing first and second inner sidewalls 1131, 1132 thereof, and includes a plurality of flow-dividing protrusions 131 alternately located close to the first inner sidewall 1131 and the second inner sidewall 1132. Each of the flow-dividing protrusions 131 has a first lateral side 1311 and a second lateral side 1312 opposite to the first lateral side 1311. The first lateral side 1311 of the flow-dividing protrusion 131 and the first inner sidewall 1131 of the main flow passage 113 face toward each other to define a first sub-passage 114 therebetween; the second lateral side 1312 of the flow-dividing protrusion 131 and the second inner sidewall 1132 of the main flow passage 113 face toward each other to define a second sub-passage 115 therebetween; and the first and second sub-passages 114, 115 communicate with the main flow passage 113. The cooling liquid in the main flow passage 113 flowing to each flow-dividing protrusion 131 is divided into two flows that separately flow into the first sub-passage 114 and the second sub-passage 115 at the same time. After passing the flow-dividing protrusion 131, the separated cooling liquid flows converge in the main flow passage 113. By providing the flow-dividing section 13 in the main flow passage 113, the cooling liquid is able to contact with an increased heat transfer area. As a result, the water-cooling structure of the present invention can provide effectively upgraded heat dissipation effect and increased heat transfer area.

Figure 9B:
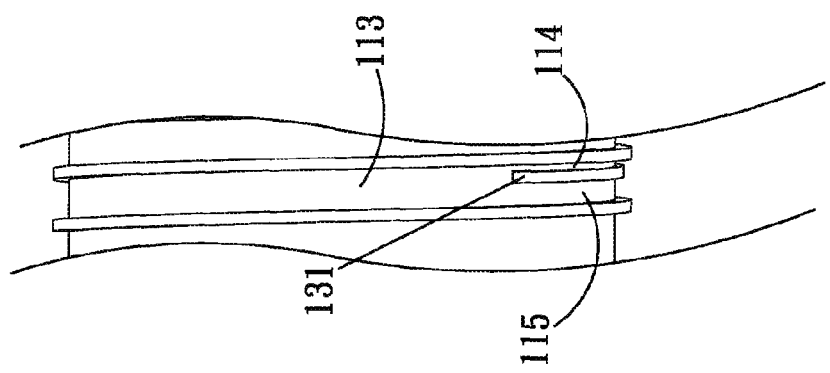
FIGS. 9A and 9B are two fragmentary right side views of the heat-dissipation base of FIG. 8 showing two different ways of arranging flow-dividing protrusions thereon.
Figure 9A:
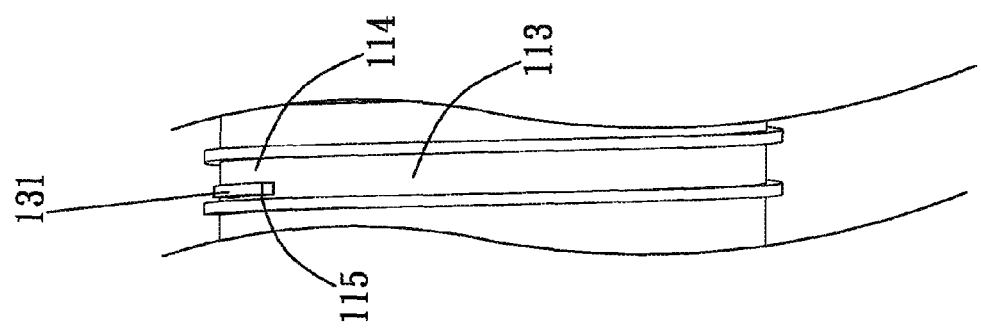

Please refer to FIGS. 9A and 9B. The first sub-passage 114 and the second sub-passage 115 can be differently arranged in the main flow passage 113 according to a user's actual need or a required heat dissipation environment. For example, the first sub-passage 114 may have a width larger than that of the second sub-passage 115, as shown in FIG. 9A, or alternatively, the first sub-passage 114 may have a width smaller than that of the second sub-passage 115, as shown in FIG. 9B. The flow-dividing protrusions 131 illustrated in the second embodiment are in an elongated rectangular shape. However, it is understood the flow-dividing protrusions 131 can be differently shaped without being limited to the elongated rectangular shape.

Further, the flow-dividing protrusions 131 illustrated in the second embodiment have a width equal to one third of a width of the main flow passage 113. However, it is understood the width of the flow-dividing protrusions 131 is not necessarily limited to the above-illustrated case but can be, for example, smaller than one third of the width of the main flow passage 113.

Figure 11:
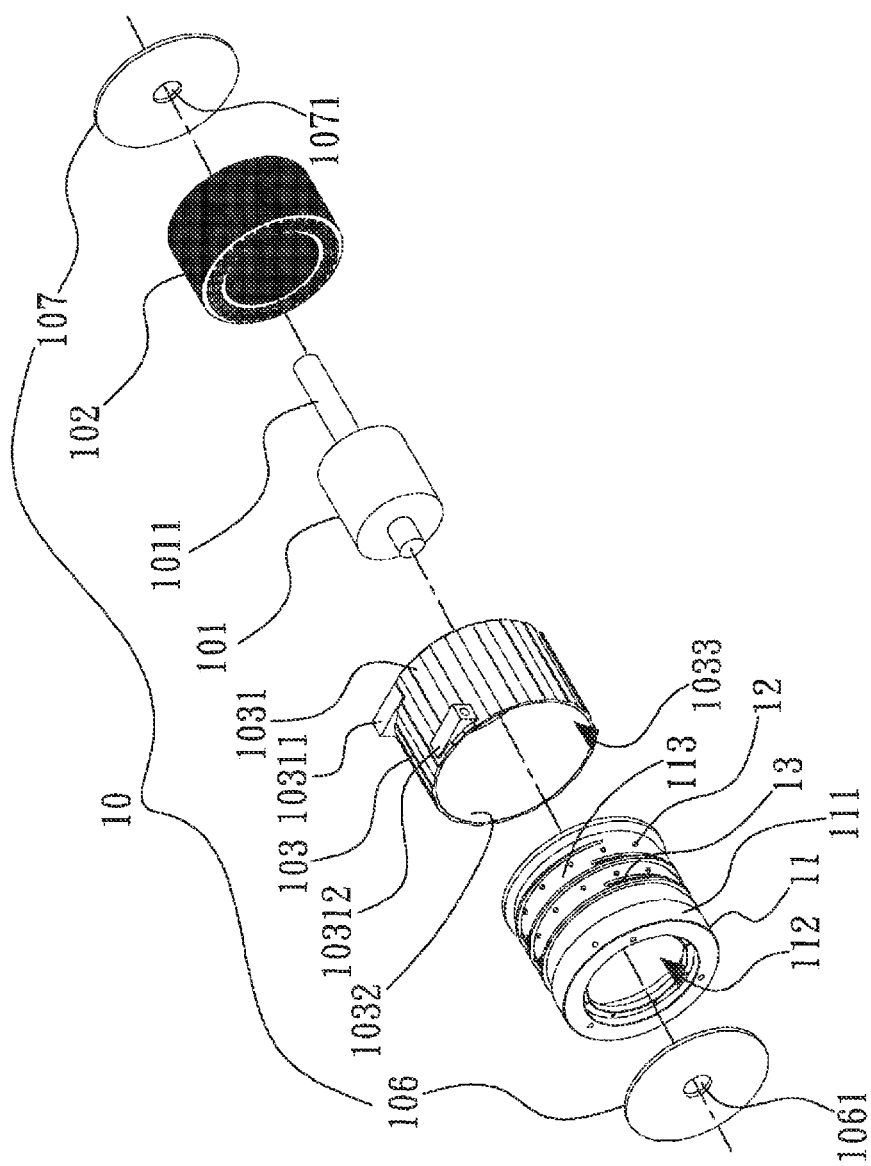
FIG. 11 is an exploded perspective view of a water-cooling structure for electric motor according to a third preferred embodiment of the present invention.

FIG. 11 is an exploded perspective view showing a water-cooling structure for electric motor according to a third preferred embodiment of the present invention. The water-cooling structure in the third embodiment includes a motor main body 10, a heat-dissipation base 11, a vortex-forming section 12, and a flow-dividing section 13. The motor main body 10 has a main structure generally similar to that of the motor main body 10 in the first embodiment and is therefore not repeatedly described in details herein. The heat-dissipation base 11 includes a hollow chamber 112 communicating with the receiving space 1033, and at least one main flow passage 113. The heat-dissipation base 11 is fitted in the receiving space 1033 to contact with the inner sidewall 1032. The sub-assembly of the rotor 101 and stator 102 is fitted in the hollow chamber 112. The main flow passage 113 is formed on the outer circumferential surface of the heat-dissipation base 11. In other words, the main flow passage 113 is extended around the outer circumferential surface of the heat-dissipation base 11.

Figure 12:
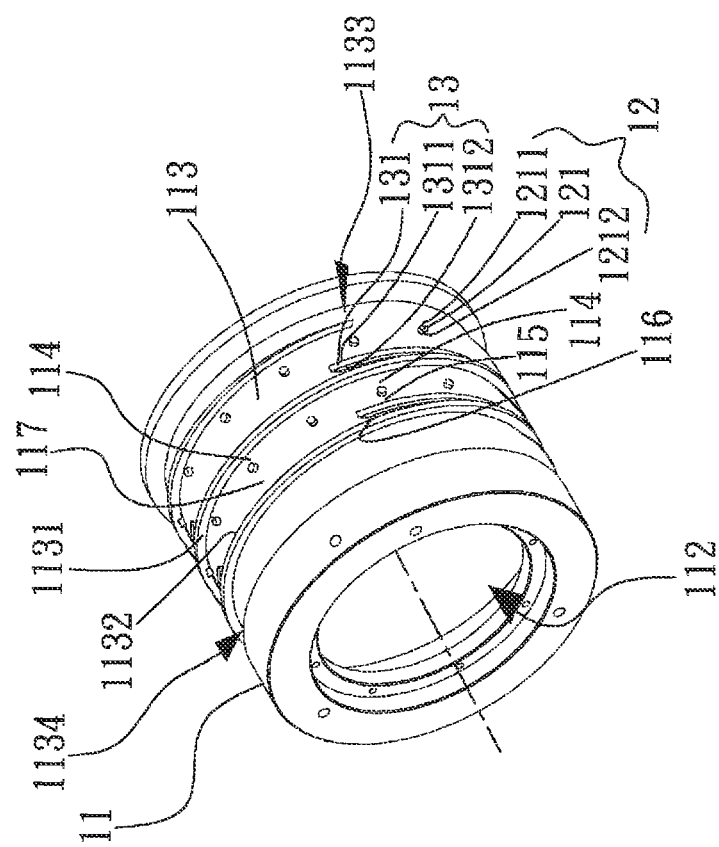
FIG. 12 is a perspective view of a first type of the heat-dissipation base for the water-cooling structure according to the third preferred embodiment of the present invention.

FIG. 12 is a perspective view of a first type of the heat-dissipation base 11 for the third embodiment of the present invention. As shown, the main flow passage 113 has a first inner sidewall 1131, a second inner sidewall 1132, a first end 1133, and a second end 1134. The first inner sidewall 1131 and the second inner sidewall 1132 face toward each other to define the main flow passage 113 therebetween. The first end 1133 and the second end 1134 respectively communicate with the outlet 10311 and the inlet 10312 provided on the enclosure 103 of the motor main body 10.

The flow-dividing section 13 is provided in the main flow passage 113 between the two facing first and second inner sidewalls 1131, 1132, and includes a plurality of flow-dividing protrusions 131 alternately located close to the first inner sidewall 1131 and the second inner sidewall 1132. Each of the flow-dividing protrusions 131 has a first lateral side 1311 and a second lateral side 1312 opposite to the first lateral side 1311.

The vortex-forming section 12 is provided in the main flow passage 113 and includes a plurality of vortex-forming blocks 121. The vortex-forming blocks 121 in a first part of the vortex-forming section 12 are located at and raised from a central position between the flow-dividing section 13 and the first or the second inner sidewall of the main flow passage 113, while the vortex-forming blocks 121 in a second part of the vortex-forming section 12 are located at and raised from a central position between the first and the second inner sidewall 1131, 1132 of the main flow passage 113 without the flow-dividing protrusions 131 provided therebetween.

Each of the vortex-forming blocks 121 has a first lateral side 1211 and a second lateral side 1212. The vortex-forming blocks 121 in the first part of the vortex-forming section 12 and the flow-dividing protrusions 131 located to one side thereof together divide the main flow passage 113 between the first and the second inner sidewall 1131, 1132 into three sub-passages, namely, a first sub-passage 114 located between the first lateral side 1211 of the vortex-forming blocks 121 and the first inner sidewall 1131 of the main flow passage 113, a second sub-passage 115 located between the second lateral side 1212 of the vortex-forming blocks 121 and the first lateral side 1311 of the flow-dividing protrusions 131, and a third sub-passage 116 located between the second lateral side 1312 of the flow-dividing protrusions 131 and the second inner sidewall 1132 of the main flow passage 113. The first, the second and the third sub-passage 114, 115, 116 all are communicable with the main flow passage 113.

On the other hand, the vortex-forming blocks 121 in the second part of the vortex-forming section 12 divide the main flow passage 113 into two sub-passages, namely, a first sub-passage 114 located between the first lateral side 1211 of the vortex-forming blocks 121 and the first inner sidewall 1131 of the main flow passage 113, and a fourth sub-passage 117 located between the second lateral side 1212 of the vortex-forming blocks 121 and the second inner sidewall 1132 of the main flow passage 113. The fourth sub-passage 117 is communicable with the first, the second, and the third sub-passage 114, 115, 116 and the main flow passage 113. When the cooling liquid in the main flow passage 113 flows to the flow-dividing protrusions 131 and the vortex-forming blocks 121 in the first part of the vortex-forming section 12, a part of the cooling liquid is divided by the flow-dividing protrusions 131 into two separated flows, which flow through the second and the third sub-passage 115, 116 and then converge in the main flow passage 113 downstream the flow-dividing protrusions 131. Meanwhile, another part of the cooling liquid is interfered by the vortex-forming blocks 121 in the first part of the vortex-forming section 12 to flow through the first and the second sub-passage 114, 115 and create the vortex effect downstream the vortex-forming blocks 121 before converging in the main flow passage 113.

The flows of the cooling liquid flowing through the first, the second, and the third sub-passage 114, 115, 116 finally converge again in the main flow passage 113 downstream the vortex-forming blocks 121 and the flow-dividing protrusions 131, and the converged cooling liquid keeps flowing forward in the main flow passage 113. The cooling liquid flowing to and interfered by the vortex-forming blocks 121 in the second part of the vortex-forming section 12 will be separated to flow through the first and the fourth sub-passage 114, 117 and create the vortex effect downstream the vortex-forming blocks 121 before converging again in the main flow passage 113. The converged cooling liquid then keeps flowing through the main flow passage 113. In this manner, the cooling liquid circulates in the main flow passage 113 to thereby enable effectively increased heat dissipation effect and upgraded heat exchange efficiency.

Figure 13:
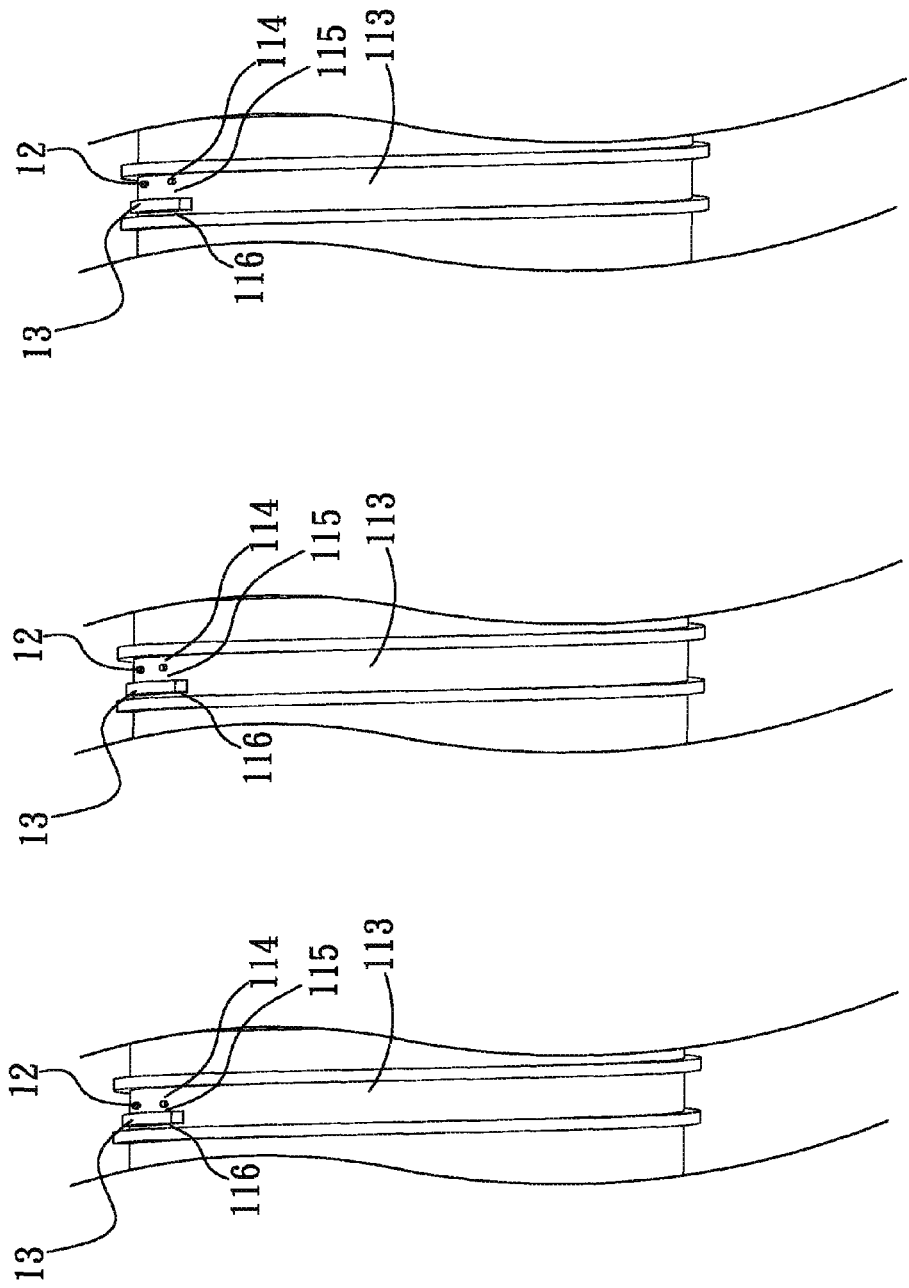
FIGS. 13A, 13B and 13C are fragmentary right side views of the first-type heat-dissipation base of FIG. 12 showing three different ways of arranging flow-dividing protrusions and vortex-forming blocks thereon.

The first, the second, and the third sub-passage 114, 115, 116 can be differently arranged in the main flow passage 113 according to a user's actual need or a required heat dissipation environment. For example, the first sub-passage 114 may have a width larger than that of the second and the third sub-passage 115, 116, as shown in FIG. 13A, or the first sub-passage 114 may have a width equal to that of the second sub-passage 115, as shown in FIG. 13B, or the first sub-passage 114 may have a width smaller than that of the second sub-passage 115, as shown in FIG. 13C.

Figure 14:
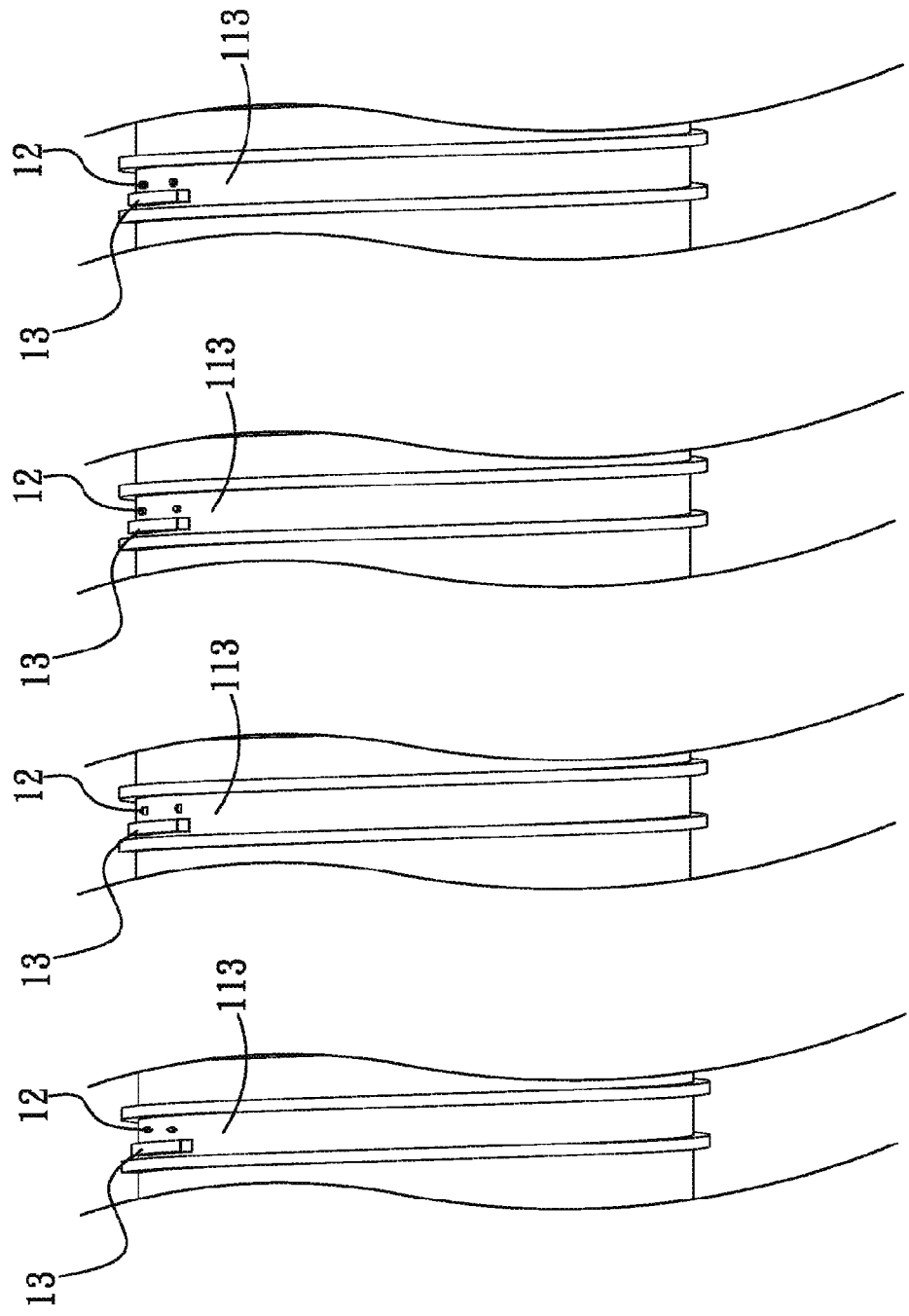
FIGS. 14A to 14D are fragmentary right side views showing four differently shaped vortex-forming blocks for the first-type heat-dissipation base of FIG. 12.

The flow-dividing protrusions 131 are in an elongated rectangular shape, and the vortex-forming blocks 121 can be rectangular-shaped without being limited thereto. For example, the vortex-forming blocks 121 can be diamond-shaped as shown in FIG. 14A, triangular-shaped as shown in FIG. 14B, round-shaped as shown in FIG. 14C, or irregularly shaped as shown in FIG. 14D.

Figure 15:
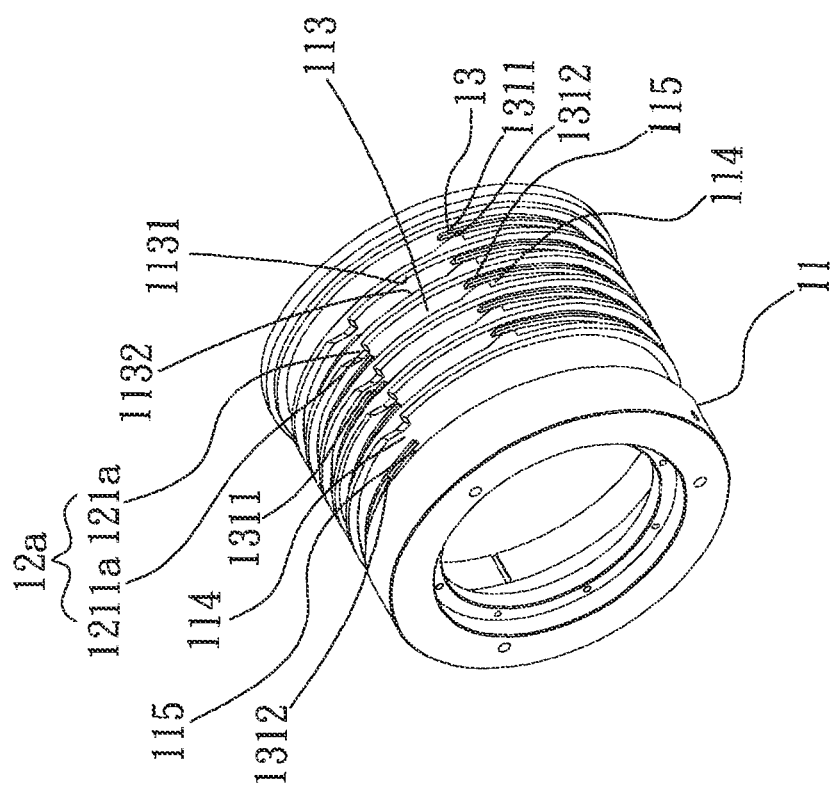
FIG. 15 is a perspective view of a second type of the heat-dissipation base for the water-cooling structure according to the third preferred embodiment of the present invention.
Figure 16:
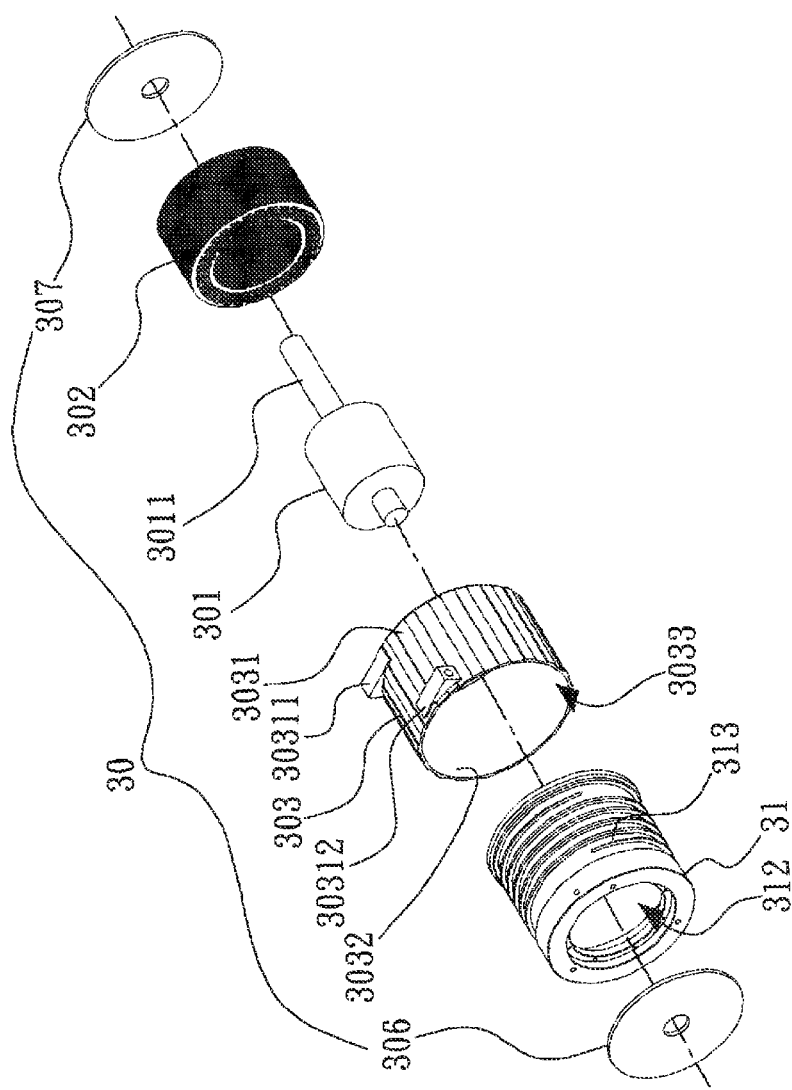
FIG. 16 is an exploded perspective view of a conventional water-cooling structure for motor.

FIG. 15 is a perspective view of a second type of the heat-dissipation base 11 for the water-cooling structure according to the third preferred embodiment of the present invention. As shown, in the second type, the heat-dissipation base 11 has a vortex-forming section 12a including a plurality of vortex-forming blocks 121a, some of which are sidewardly protruded from the first inner sidewall 1131 of the main flow passage 113 toward the flow-dividing section 13 while others are sidewardly protruded from the second inner sidewall 1132 toward the flow-dividing section 13, such that the vortex-forming blocks 121a separately protruded from the first inner sidewall 1131 and the second inner sidewall 1132 in the same main flow passage 113 are arranged in staggered relation to one another. Each of the vortex-forming blocks 121a has a first lateral side 1211a facing toward the first inner sidewall 1131 or the second inner sidewall 1132 of the main flow passage 113. The first lateral side 1211a of the vortex-forming block and the first or the second lateral side 1311, 1312 of the flow-dividing protrusion 131 facing thereto together define a first sub-passage 114 therebetween; and the first or the second lateral side 1311, 1312 of the flow-dividing protrusions 131 and the first or the second inner sidewall 1131, 1132 facing thereto together define a second sub-passage 115 therebetween. The first and the second sub-passage 114, 115 are communicable with the main flow passage 113.

With the above arrangements, the present invention is superior to the prior art in enabling (1) increased heat dissipation effect; (2) increased heat transfer area; and (3) increased heat exchange efficiency.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A water-cooling structure for electric motor, comprising:
a motor main body having a rotor and a stator fitted around the rotor to form a sub-assembly; an enclosure having an outer side and an inner side, the outer side being provided with an outlet and an inlet, and the inner side defining a receiving space therein;
a heat-dissipation base being fitted in the receiving space; the heat-dissipation base having an outer circumferential surface contacting with the inner side of the enclosure, a hollow chamber for receiving the sub-assembly of the rotor and stator therein, and at least one main flow passage provided on and extended along the outer circumferential surface and communicating with the outlet and the inlet, wherein the main flow passage has a first inner sidewall and an opposite second inner sidewall; and
a vortex-forming section being provided between the first inner sidewall and the second inner sidewall of the main flow passage, and wherein the vortex-forming section includes a plurality of vortex-forming blocks; some of the vortex-forming blocks being sidewardly protruded from the first inner sidewall of the main flow passage toward the second inner sidewall while others being sidewardly protruded from the second inner sidewall toward the first inner sidewall, such that the vortex-forming blocks on the first inner sidewall and the second inner sidewall in the same main flow passage are arranged in staggered relation to one another; and each of the vortex-forming blocks having a first lateral side facing toward the first inner sidewall or the second inner sidewall.

2. The water-cooling structure for electric motor as claimed in claim 1, wherein the vortex-forming section includes a plurality of vortex-forming blocks raised from the main flow passage, and each of the vortex-forming blocks has a first lateral side and an opposite second lateral side.

3. The water-cooling structure for electric motor as claimed in claim 2, wherein the first lateral side of the vortex-forming block and the first inner sidewall of the main flow passage together define a first sub-passage therebetween, and the second lateral side of the vortex-forming block and the second inner sidewall of the main flow passage together define a second sub-passage therebetween.

4. The water-cooling structure for electric motor as claimed in claim 3, wherein the first sub-passage has a width being selectively larger than, equal to, or smaller than a width of the second sub-passage.

5. The water-cooling structure for electric motor as claimed in claim 4, wherein the vortex-forming blocks have a shape selected from the group consisting of a diamond shape, a rectangular shape, a triangular shape, a round shape, and any other irregular shapes.

6. The water-cooling structure for electric motor as claimed in claim 1, wherein the vortex-forming blocks have a shape selected from the group consisting of a diamond shape, a rectangular shape, a triangular shape, a round shape, and any other irregular shapes.

7. The water-cooling structure for electric motor as claimed in claim 5, wherein the vortex-forming blocks have a width being selectively equal to or smaller than one third of a width of the main flow passage.

8. The water-cooling structure for electric motor as claimed in claim 1, wherein the motor main body further includes a first cover and a second cover separately connected to two axially opposite ends of the receiving space, and the first and second covers respectively having a hole communicating with the receiving space.

* * * * *